(12) United States Patent
Way et al.

(10) Patent No.: US 8,808,597 B2
(45) Date of Patent: Aug. 19, 2014

(54) PAN-BASED CARBON FIBERS AND FABRICATION METHOD THEREOF AND PRECURSOR RAW MATERIAL THEREOF

(75) Inventors: Tun-Fun Way, Hsinchu (TW); Jiun-Jy Chen, Miaoli Count (TW); Yu-Ting Chen, Changhua County (TW); Kai-Jen Hsiao, Miaoli County (TW); Shu-Hui Cheng, Hsinchu County (TW); Jong-Pyng Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 643 days.

(21) Appl. No.: 12/979,857

(22) Filed: Dec. 28, 2010

(65) Prior Publication Data

US 2011/0160369 A1 Jun. 30, 2011

(30) Foreign Application Priority Data

Dec. 31, 2009 (TW) ................ 98146307 A
Nov. 9, 2010 (TW) ................ 99138454 A

(51) Int. Cl.
| | | |
|---|---|---|
| *C08K 7/24* | (2006.01) | |
| *C08F 220/14* | (2006.01) | |
| *C08F 220/04* | (2006.01) | |
| *C08F 220/44* | (2006.01) | |
| *C08L 33/20* | (2006.01) | |

(52) U.S. Cl.
USPC ...... 264/211.12; 524/284; 524/559; 524/379; 977/742; 977/750; 977/752; 526/325

(58) Field of Classification Search
CPC ......... C08K 7/24; D01F 11/122; D01F 9/225; C08F 220/14; C08F 220/04; C08F 220/44; C08L 33/20
USPC ............. 524/401, 284, 559, 379; 264/211.12; 526/325; 977/742, 750, 752
See application file for complete search history.

(56) References Cited

U.S. PATENT DOCUMENTS

| | | | |
|---|---|---|---|
| 5,602,222 A | 2/1997 | Smierciak et al. | |
| 2006/0135677 A1 | 6/2006 | Huang et al. | |
| 2006/0183834 A1* | 8/2006 | Kuwahara et al. ............ | 524/401 |

FOREIGN PATENT DOCUMENTS

| | | |
|---|---|---|
| CN | 101413153 | 4/2009 |
| JP | 2004-143602 | 5/2004 |
| JP | 2009-001921 | 1/2009 |
| JP | 2009-079343 | 4/2009 |
| TW | I297693 | 6/2008 |
| WO | WO2008/054836 | 5/2008 |

OTHER PUBLICATIONS

Davidson, et al., "Investigation of molecular orientation in melt-spun high acrylonitrile fibers", Polymer 41 (2000) pp. 3357-3364.
Rahaman, et al., "A review of heat treatment on polyacrylonitrile fiber", Polymer Degradation and Stability 92. Apr. 14, 2007, pp. 1421-1432.
Wang, et al., "High-Temperature DSC Study of Polyacrylonitrile Precursors during Their Conversion to Carbon Fibers", Journal of Applied Polymer Science, Jul. 17, 2007, pp. 1787-1792.
Hutchinson, et al., "An investigation of the structure-property relationships in melt-processable high-acrylonitrile copolymer filaments", Journal Material Science, Jun. 7, 2008, pp. 5143-5156.
Mikolajczyk, et al., "Effect of Spinning Conditions on the Mechanical Properties of Polyacrylonitrile Fibers Modified with Carbon Nanotubes", Journal of Applied Polymer Science, Nov. 4, 2009, pp. 3628-3635.
Chae, et al., "Stabilization and carbonization of gel spun polyacrylonitrile/single wall carbon nanotube composite fibers", Polymer 48, May 6, 2007, pp. 3781-3789.
Sreekumar, et al., "Polyacrylonitrile Single-Walled Carbon Nanotube Composite Fibers", Advanced Materials, Jan. 5, 2004, pp. 58-61.
Choi, et al., "Characterization of new polyacrylonitrile-co-bis[2-(2-methoxyethoxy)ethyl]itaconate based gel polymer electrolytes", Electrochimica Acta 46, May 30, 2001, pp. 3475-3479.
Mukundan, et al., "A photocrosslinkable melt processible acrylonitrile terpolymer as carbon fiber precursor" Polymer 47, Apr. 3, 2006, pp. 4163-4171.

\* cited by examiner

*Primary Examiner* — James J Seidleck
*Assistant Examiner* — Deve E Valdez
(74) *Attorney, Agent, or Firm* — Muncy, Geissler, Olds & Lowe, P.C.

(57) ABSTRACT

A precursor raw material for the PAN-based carbon fibers represented by Formula (I) is provided.

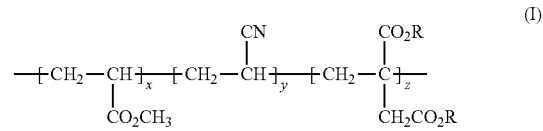

In Formula (I), R is methyl, ethyl or propyl, x+z=0.5-20.0 mol %, z≥0.5 mol %, y=99.5-80.0 mol % and x+y+z=100 mol %. The invention also provides a PAN-based oxidized fiber and a PAN-based carbon fiber prepared by the precursor raw material for the PAN-based carbon fibers.

1 Claim, No Drawings

PAN-BASED CARBON FIBERS AND FABRICATION METHOD THEREOF AND PRECURSOR RAW MATERIAL THEREOF

CROSS REFERENCE TO RELATED APPLICATIONS

This Application claims priority of Taiwan Patent Application No. 98146307, filed on Dec. 31, 2009, and Taiwan Patent Application No. 99138454, filed on Nov. 9, 2010, the entirety of which is incorporated by reference herein.

BACKGROUND OF THE INVENTION

1. Field of the Invention

The invention relates to a carbon fiber, and more specifically to a PAN-based carbon fiber, a fabrication method thereof and a precursor raw material thereof.

2. Description of the Related Art

According to studies by the Department of Energy, USA, if 25% of car materials are replaced with carbon fiber composite materials, fuel efficiency will increase by 30% due to the lighter weight, which will save fuel amount by up to 15% and decrease carbon dioxide emissions by more than 20%. Currently, PAN-based carbon fibers produced by a wet-spinning (solvent spinning) method hold 90% of the world carbon fiber market. Although melt-spinning (non-solvent) PAN-based carbon fibers have competitive advantages of low-cost and environmental friendliness, commercialization thereof has yet to be realized. According to reports by J. A. Davidson, S. R. Hutchinson and T. Mukundann etc., currently, the difficulties of producing carbon fiber precursors from PAN polymers by the melt-spinning method are: (1) if the quantity of co-monomers in the PAN polymer is too low (which means the quantity of acrylonitrile (AN) in the PAN polymer is too high), the spinning process will cause a cross-linking reaction etc., and the fiber breakage rate will be high, wherein the fibers are not able to be rolled successfully; and (2) if the quantity of co-monomers in the PAN polymer is too high (which means the quantity of acrylonitrile (AN) in the PAN polymer is too low), while melt-spinning can be accomplished, however, time will increase during the subsequent high-temperature oxidization reaction of the fiber precursors, which will increase defects, lower yield, and decrease quality of the carbon fiber products. PAN copolymers for ordinary plastics need to have appropriate co-monomer categories and percentages during the melt-spinning process in order to appropriately produce melt-spinning PAN-based carbon fiber precursors and then melt-spinning PAN-based carbon fibers. Currently, the most critical issue needed to be resolved when preparing melt-spinning PAN-based carbon fibers from fiber precursors is the long oxidization process (around more than 20 hours), which increases defects, lowers strength and lowers yield of carbon fiber products. Compared with conventional wet-spinning PAN-based carbon fibers, the problems of melt-spinning PAN-based carbon fibers come from the differences between the composition of the polymer precursors; specifically: a. a high-quantity of co-monomers with low oxidization/cyclization ability, for example methyl acrylate (MA) (around 15 mol %), however, the wet-spinning polymer precursor is around the itaconic acid (IA) (1 mol %) and MA (2 mol %) levels; b. the melt-spinning polymer precursor does not contain the compounds capable of catalyzing oxidization/cyclization, for example acidic itaconic acid (IA), decreasing the ability and rate of oxidization/cyclization.

BRIEF SUMMARY OF THE INVENTION

One embodiment of the invention provides a precursor raw material for the PAN-based carbon fibers, represented by Formula (I).

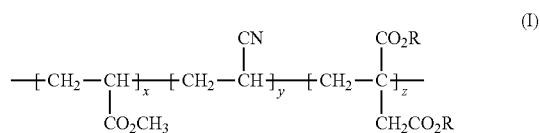

In Formula (I), R is methyl, ethyl or propyl, $x+z=0.5\text{-}20.0$ mol %, $z \geq 0.5$ mol %, $y=99.5\text{-}80.0$ mol % and $x+y+z=100$ mol %.

In Formula (I),

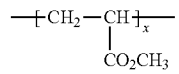

is a methyl acrylate (MA) monomer product,

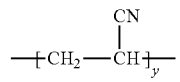

is an acrylonitrile (AN) monomer product, and

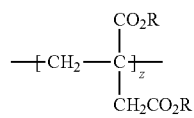

is a dialkyl itaconate monomer product.

One embodiment of the invention provides a PAN-based carbon fiber, prepared by the following steps, comprising: providing a slice (raw material granule) which is used to prepare melt-spinning PAN-based carbon fibers or a spinning solution which is used to prepare wet-spinning PAN-based carbon fibers, wherein the raw material granule or the spinning solution comprises the disclosed precursor raw material represented by Formula (I) for the PAN-based carbon fibers; performing a spinning process on the raw material granule or the spinning solution to form a fiber precursor; performing an oxidization process on the fiber precursor to form an oxidized fiber; and performing a thermal treatment on the oxidized fiber to form a PAN-based carbon fiber.

Generally, conventional precursor raw materials for the PAN-based carbon fibers do not use high steric-hindrance monomers with dual functional groups similar to a side-chain structure, but, the novel precursor raw material for the melt-spinning PAN-based carbon fibers developed by the invention uses monomers containing dual functional groups, for example dialkyl itaconate. The polymer formed therefrom does not contain acidic or basic compounds, but has similar acidic or basic catalysis effects under the oxidization process (around 150-250° C.). The results of the examples of the invention demonstrate that, in such polymer structures, the dialkyl itaconate will form an acidic compound under high-temperature oxidization, and proceed with reaction of oxidization/cyclization under low-temperature oxidization, thus, improving the ability of PAN oxidization/cyclization and the rate of oxidization, shortening the time of PAN fiber oxidization, and making melt-spinning PAN-based carbon fiber products more competitive. In addition, the precursor raw material developed from the invention may be applied to the wet-spinning field.

One embodiment of the invention provides a precursor composite raw material for the PAN-based carbon fibers, comprising: the disclosed precursor raw material for the PAN-based carbon fibers; and a plurality of carbon nanotubes with functional groups on surfaces thereof blended with the precursor raw material.

One embodiment of the invention provides a method for fabricating a PAN-based carbon fiber, comprising: providing a spinning solution, wherein the spinning solution comprises the disclosed precursor composite raw material for the PAN-based carbon fibers and a solvent; performing a wet-spinning process on the spinning solution to form a fiber precursor; performing an oxidization process on the fiber precursor to form an oxidized fiber; and performing a thermal treatment on the oxidized fiber to form a PAN-based carbon fiber.

One embodiment of the invention provides a PAN-based carbon fiber prepared from the disclosed precursor composite raw material for the PAN-based carbon fibers.

A detailed description is given in the following embodiments.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

One embodiment of the invention provides a precursor raw material for the PAN-based carbon fibers, represented by Formula (I).

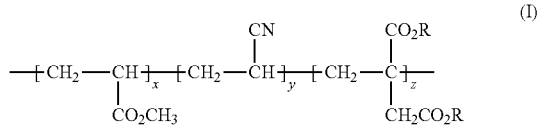

In Formula (I), R may be methyl, ethyl or propyl, $x+z=0.5\text{-}20.0$ mol %, $z \geq 0.5$ mol %, $y=99.5\text{-}80.0$ mol % and $x+y+z=100$ mol %, or preferably R is methyl, $x+z=0.5\text{-}15.0$ mol %, $z \geq 0.5$ mol % and $y=99.5\text{-}85.0$ mol %.

In Formula (I),

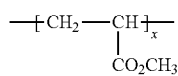

is a methyl acrylate (MA) monomer product,

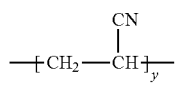

is an acrylonitrile (AN) monomer product, and

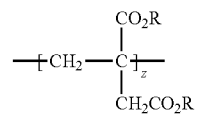

is a dialkyl itaconate monomer product.

In accordance with then embodiment of the invention, in Formula (I), the total mole percentage of the group

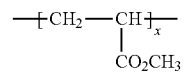

and the group

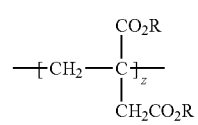

in the precursor raw material for the PAN-based carbon fibers is about 0.5-20.0 mol %. The mole percentage of the group

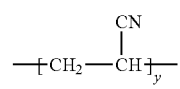

in the precursor raw material for the PAN-based carbon fibers is about 99.5-80.0 mol %, $x+z=0.5\text{-}20.0$ mol %, and $z \geq 0.5$ mol %.

In accordance with then another embodiment of the invention, in Formula (I), the total mole percentage of the group

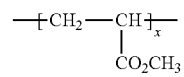

and the group

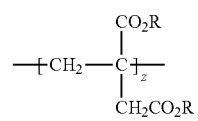

in the precursor raw material for the PAN-based carbon fibers is about 10.0-20.0 mol %. The mole percentage of the group

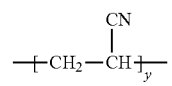

in the precursor raw material for the PAN-based carbon fibers is about 90.0-80.0 mol %, $x+z=10.0\text{-}20.0$ mol %, and $z \geq 1.0$ mol %, or most preferably $y=90.0\text{-}85.0$ mol %, $x+z=10.0\text{-}15.0$ mol %, and $z \geq 1.0$ mol %.

In this embodiment, according to the molar ratios of the group

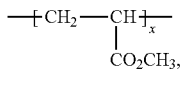

the group

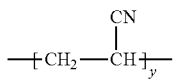

and the group

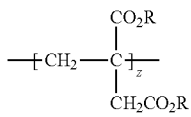

in the precursor raw material for the PAN-based carbon fibers, the precursor raw material for the PAN-based carbon fibers may be a melt-spinning precursor raw material for the PAN-based carbon fibers.

In accordance with then another embodiment of the invention, in Formula (I), the total mole percentage of the group

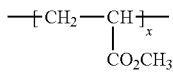

and the group

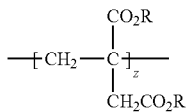

in the precursor raw material for the PAN-based carbon fibers is about 0.5-4.0 mol %. The mole percentage of the group

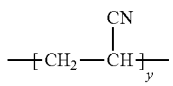

in the precursor raw material for the PAN-based carbon fibers is about 99.5-96.0 mol %, x+z=0.5-4.0 mol %, and z≥0.5 mol %, or most preferably y=99.5-98.0 mol %, x+z=0.5-2.0 mol %, and z≥0.5 mol %.

In this embodiment, according to the molar ratios of the group

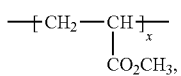

the group

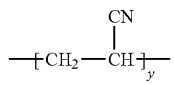

and the group

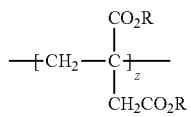

in the precursor raw material for the PAN-based carbon fibers, the precursor raw material for the PAN-based carbon fibers may be a wet-spinning precursor raw material for the PAN-based carbon fibers.

One embodiment of the invention provides a PAN-based carbon fiber, prepared by the following steps. First, a slice (raw material granule) which is used to prepare melt-spinning PAN-based carbon fibers or a spinning solution which is used to prepare wet-spinning PAN-based carbon fibers is provided. The used raw material granule or spinning solution comprises the disclosed precursor raw material for the PAN-based carbon fibers. Next, a spinning process is performed to the raw material granule or the spinning solution to form a fiber precursor. An oxidization process is then performed to the fiber precursor to form an oxidized fiber. Next, a thermal treatment is performed to the oxidized fiber to form a PAN-based carbon fiber.

The slice (raw material granule) which is used to prepare the melt-spinning PAN-based carbon fibers is a melt-spinning precursor raw material for the PAN-based carbon fibers, represented by Formula (I).

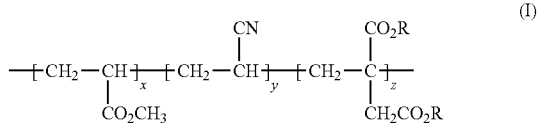

In Formula (I), the total mole percentage of the group

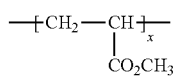

and the group

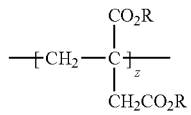

in the precursor raw material for the PAN-based carbon fibers is about 10.0-20.0 mol %. The mole percentage of the group

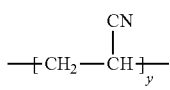

in the precursor raw material for the PAN-based carbon fibers is about 90.0-80.0 mol %, x+z=10.0-20.0 mol %, and z≥1.0 mol %, or most preferably y=90.0-85.0 mol %, x+z=10.0-15.0 mol %, and z≥1.0 mol %.

The spinning solution which is used to prepare the wet-spinning PAN-based carbon fibers is a wet-spinning precursor raw material for the PAN-based carbon fibers, represented by Formula (I).

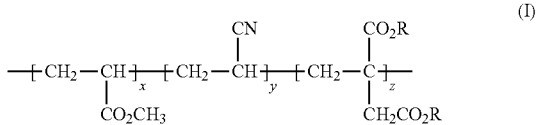

In Formula (I), the total mole percentage of the group

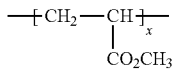

and the group

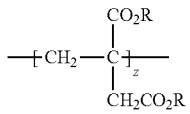

in the precursor raw material for the PAN-based carbon fibers is about 0.5-4.0 mol %. The mole percentage of the group

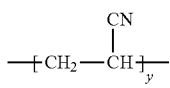

in the precursor raw material for the PAN-based carbon fibers is about 99.5-96.0 mol %, x+z=0.5-4.0 mol %, and z≥0.5 mol %, or most preferably y=99.5-98.0 mol %, x+z=0.5-2.0 mol %, and z≥0.5 mol %.

The spinning solution is prepared by, for example, a solvent of dimethylsulfoxide (DMSO), N,N-dimethylforamide or N,N-dimethylacetamide with a concentration of about 20-40%.

The spinning process may comprise a melt-spinning process or wet-spinning process. In the melt-spinning process, the spinning temperature thereof is about 160-230° C. The fiber precursor formed by the melt-spinning process has fiber strength which is more than or equal to 1.0 g/den, or preferably 1.5-3.5 g/den, and elongation which is less than or equal to 40%, or preferably 30.0-10.0%. In the wet-spinning process, the spinning temperature thereof is about 60-85° C. The fiber precursor formed by the wet-spinning process has fiber strength of about 3.0-4.0 g/den and elongation of about 12.0-5.0%. The wet-spinning process may comprise using a coagulating solution, for example dimethylsulfoxide (DMSO), N,N-dimethylforamide, N,N-dimethylacetamide or water.

The oxidized fiber formed by the melt-spinning process and the oxidization process is conducted at a limiting oxygen index (LOI) of about 40-70, or preferably 40-60, a density which is more than or equal to 1.2 g/cm³, or preferably 1.2-1.3 g/cm³, fiber strength of about 1.0-2.0 g/den, and elongation of about 30.0-10.0%.

The oxidized fiber formed by the wet-spinning process and the oxidization process is conducted at a limiting oxygen index (LOI) of about 45-65, a density of about 1.25-1.38 g/cm³, fiber strength of about 1.5-3.0 g/den, and elongation of about 3.0-1.0%.

Additionally, the carbon fiber formed by the melt-spinning process, the oxidization process and the thermal treatment has a density of about 1.0-1.8 kg/m³, or preferably 1.5-1.8 kg/m³.

The carbon fiber formed by the wet-spinning process, the oxidization process and the thermal treatment has a density of about 1.6-1.8 kg/m³.

The novel precursor raw material for melt-spinning PAN-based carbon fibers developed by the invention does not contain acidic or basic compounds, but has similar acidic or basic catalysis effects under the oxidization process (around 150-250° C.). The results of the examples of the invention demonstrate that, in such polymer structures, the dialkyl itaconate will form an acidic compound under high-temperature oxidization, and proceed with reaction of oxidization/cyclization under low-temperature oxidization, thus, improving the ability of PAN oxidization/cyclization and the rate of oxidization, shortening the time of PAN fiber oxidization, and making melt-spinning PAN-based carbon fiber products more competitive. In addition, the precursor raw material developed from the invention may be applied to the precursor raw material for wet-spinning PAN-based carbon fibers field and related applications.

One embodiment of the invention provides a precursor composite raw material for the PAN-based carbon fibers comprising the disclosed precursor raw material represented by Formula (I) for the PAN-based carbon fibers and a plurality of carbon nanotubes with functional groups on surfaces thereof blended with the precursor raw material.

In an embodiment, the carbon nanotubes may comprise single-layered or multiple-layered carbon nanotubes and the functional groups on the surfaces thereof may comprise carboxyl groups, hydroxyl groups or phenyl groups. The carbon nanotubes with carboxyl groups or hydroxyl groups may be prepared using, for example concentrated fuming sulfuric acid. The carbon nanotubes with phenyl groups may be prepared by reacting the carbon nanotubes with 3,4-dihydroxybenzaldehyde and N-methylglycine in dimethyl fumarate (DMF) organic solvent under ultrasonication. In an embodiment, the carbon nanotubes have a weight ratio of about 0.01-20 or 0.1-12 parts by weight, or preferably 0.3-6 parts by weight, or most preferably 0.5-4 parts by weight, based on 100 parts by weight of the precursor raw material and the carbon nanotubes.

One embodiment of the invention provides a method for fabricating a PAN-based carbon fiber, comprising the following steps. First, a spinning solution is provided. The spinning solution comprises the disclosed precursor composite raw material for the PAN-based carbon fibers and a solvent. Next, a wet-spinning process is performed to the spinning solution to form a fiber precursor. An oxidization process is then performed to the fiber precursor to form an oxidized fiber. Next, a thermal treatment is performed to the oxidized fiber to form a PAN-based carbon fiber.

In an embodiment, the wet-spinning process is conducted at a temperature of about 60-85° C. The formed fiber precursor has fiber strength of about 2-15 g/den, or preferably 3-15 g/den, or most preferably 5-15 g/den, and elongation of about 5-30%, or preferably 8-20%, or most preferably 10-15%. In an embodiment, the solvent utilized in the spinning solution may comprise dimethylsulfoxide (DMSO), N,N-dimethylforamide (DMF), N,N-dimethylacetamide (DMAc), sodium thiocyanate (NaSCN), nitric acid or a combination thereof. The solvent has a concentration of about 5-80%, or preferably 10-75%, or most preferably 10-60%. In an embodiment, the wet-spinning process is conducted at a temperature of about 20-98° C., or preferably 30-90° C., or most preferably 40-85° C. The wet-spinning process may comprise using a coagulating solution, for example dimethylsulfoxide (DMSO), N,N-dimethylforamide (DMF), N,N-dimethylacetamide (DMAc), sodium thiocyanate (NaSCN), nitric acid, water or a combination thereof. The coagulating solution has a temperature of about 2-80° C., or preferably 5-75° C., or most preferably 10-60° C.

In an embodiment, the oxidization process is conducted at a temperature of about 190-260° C. The formed oxidized fiber has fiber strength of about 0.5-10 g/den, or preferably 1-10 g/den, or most preferably 1.5-10 g/den, elongation of about 5-30%, or preferably 7-20%, or most preferably 8-15%, a density of 1.25-1.45 g/cm$^3$, or preferably 1.32-1.40 g/cm$^3$, or most preferably 1.34-1.38 g/cm$^3$, and a limiting oxygen index (LOI) of about 28-65, or preferably 32-55, or most preferably 35-50.

In an embodiment, the thermal treatment has a temperature of about 600-1,200° C. The formed carbon fiber has fiber strength of about 1-10 GPa, or preferably 2-10 GPa, or most preferably 3-10 GPa, elongation of about 0.1-10%, or preferably 0.2-5%, or most preferably 0.3-3%, a modulus of about 100-990 GPa, or preferably 200-990 GPa, or most preferably 230-990 GPa, and a density of about 1.6-1.9 kg/m$^3$, or preferably 1.7-1.85 kg/m$^3$, or most preferably 1.75-1.82 kg/m$^3$.

In an embodiment, the disclosed precursor composite raw material is prepared to form raw material granule. In an embodiment, a melt-spinning process is performed to the raw material granule to form a fiber precursor. In an embodiment, the melt-spinning process is conducted at a temperature of about 160-230° C.

One embodiment of the invention provides a PAN-based carbon fiber prepared from the disclosed precursor composite raw material for the PAN-based carbon fibers.

In an embodiment, the carbon nanotubes have a weight ratio of about 0.01-20 parts by weight, based on 100 parts by weight of the precursor raw material and the carbon nanotubes.

In an embodiment, the carbon nanotubes may comprise single-layered or multiple-layered carbon nanotubes and the functional groups on the surfaces thereof may comprise carboxyl groups, hydroxyl groups or phenyl groups.

In the invention, because the fiber precursor prepared from the Poly(acrylonitrile-co-dimethyl itaconate) (Poly(AN-co-DMI)) is capable of producing similar acidic or basic catalysis effects under the oxidization process, the Poly(AN-co-DMI) is blended with the carbon nanotubes with functional groups on the surfaces thereof to form the composite material of the Poly(AN-co-DMI) and the carbon nanotubes. The oxidization/cyclization ability of the fiber precursor prepared from the composite material of the Poly(AN-co-DMI) and the carbon nanotubes is improved under the oxidization process, thus increasing the oxidization rate thereof. Thus, oxidization/cyclization reaction under a lower temperature of the fiber precursor may be conducted, saving oxidization time.

Additionally, in the invention, the carbon nanotubes with carboxyl, hydroxyl or phenyl functional groups on the surfaces thereof are blended with the Poly(AN-co-DMI) to form the composite material, thereby improving the dispersion of the carbon nanotubes in the Poly(AN-co-DMI). Also, the oxidized fiber and the carbon fiber prepared from the composite material of the Poly(AN-co-DMI) and the carbon nanotubes have high fiber strength and elongation.

EXAMPLES

For polymerization of the disclosed PAN copolymer, reference may be made to the method of U.S. Pat. No. 5,602,222 (Standard Oil Co., 1997).

The composition ratios of the PAN copolymers of the Examples and the Comparative Examples are calculated from the $^1$HNMR spectrum.

"Poly(AN89.5-co-DMI10.5)" represents 89.5 mol % of AN derivatives and 10.5 mol % of DMI derivatives in the copolymer.

The preparation and properties of the precursor composite raw materials, the spinning solutions, the fiber precursors, the oxidized fibers and the carbon fibers of the invention are shown as follows.

The Analysis Method:

The machine for testing the fiber strength and elongation of the PAN-based carbon fibers and oxidized fibers: an automatic strength and elongation tester (Zwick/1445)

The method for testing the fiber strength and elongation of the carbon fibers: The testing machine was an automatic strength and elongation tester (Zwick/1445). The specimen: a fiber group with a length of at least 5 cm was removed from a sample. The fiber group was then separated into single fibers using a proper method. The drawn single fiber was then utilized to prepare the specimen. The open-cell paper: The thickness of the paper was about 0.3 mm. The single fiber was straightened along the central line of the paper. The upper and lower parts of the single fiber with a specified length were fixed using an adhesive. The specimen for a tensile test was thus prepared. The fiber strength and elongation test: The specimen was installed on the fixture of the strength and elongation tester. The central part of the paper was fractured. The test condition was described as follows. The fiber strength and elongation of the specimen were tested when being fractured. The tensile speed was 1 mm/min. The clipping distance was 25 mm±0.5 mm.

The method for testing the limiting oxygen index (LOI): Reference is made to the method of ISO 4589-2.

For preparation of the carbon nanotubes with carboxyl groups or hydroxyl groups using concentrated fuming sulfuric acid, reference may be made to the method of WO 2008/140533. For preparation of the carbon nanotubes with phenyl groups, reference may be made to the method of Georgakilas V., J. (Am. Chem. Soc. 130, 8733 (2008)), using single wall carbon nanotubes (SWCNT), 3,4-dihydroxybenzaldehyde and N-methylglycine in a dimethyl fumarate (DMF) organic solvent under ultrasonication to synthesize the carbon nanotubes with phenyl groups.

Example 1

Preparation of Precursor Raw Material for Carbon Fibers (I) (Poly(AN89.5-co-DMI10.5))

First, 92.9 mol % of acrylonitrile (AN), 7.0 mol % of dimethyl itaconate (DMI), 0.1% of 2,2'-azobisisobutyronitrile (AIBN) (initiator) and 250 ml of dimethylsulfoxide (DMSO) (solvent) were mixed and reacted in a 500-ml glass reactor under 60-70° C. with stirring for 7 hours. Next, precipitates were obtained by adding methanol during a precipitation process. After filtration and drying, the physical properties of the precipitates were analyzed, as shown in Table 1. IR=2250 (cm$^{-1}$, —CN). $^1$HNMR (d$_6$-DMSO, ppm): 3.5-3.4 (methoxy of carbonyl, copolymerization product of DMI); 3.3-3.2 (methoxy of carbonyl, copolymerization product of DMI); 3.2-2.9 (α-H); 2.2-2.0 (β-H, copolymerization products of DMI and AN). In accordance with the $^1$HNMR spectrum, AN:DMI=89.5:10.5 (mol/mol %) was calculated.

Example 2

Preparation of Precursor Raw Material for Carbon Fibers (II) (Poly(AN86.4-co-DMI13.6))

The reaction conditions were similar to Example 1. However, the molar ratio of the added monomers was altered to AN:DMI=89.9:10.0. The physical properties of the products are shown in Table 1. IR=2250 (cm$^-$, —CN). $^1$HNMR (d$_6$-DMSO, ppm): 3.5-3.4 (methoxy of carbonyl, copolymerization product of DMI); 3.3-3.2 (methoxy of carbonyl, copolymerization product of DMI); 3.2-2.9 (α-H); 2.2-2.0 (β-H, copolymerization products of DMI and AN). In accordance with the $^1$HNMR spectrum, AN:DMI=86.4:13.6 (mol/mol %) was calculated.

Example 3

Preparation of Precursor Raw Material for Carbon Fibers (III) (Poly(AN84.7-co-DMI15.3))

The reaction conditions were similar to Example 1. However, the molar ratio of the added monomers was altered to AN:DMI=97.4:2.5. The physical properties of the products are shown in Table 1. IR=2250 (cm$^{-1}$, —CN of AN). $^1$HNMR (d$_6$-DMSO, ppm): 3.5-3.4 (methoxy of carbonyl, copolymerization product of DMI); 3.3-3.2 (methoxy of carbonyl, copolymerization product of DMI); 3.2-2.9 (α-H); 2.2-2.0 (β-H, copolymerization products of DMI and AN). In accordance with the $^1$HNMR spectrum, AN:DMI=84.7:15.3 (mol/mol %) was calculated.

Example 4

Preparation of Precursor Raw Material for Carbon Fibers (IV) (Poly(AN79.8-co-DMI20.2))

The reaction conditions were similar to Example 1. However, the molar ratio of the added monomers was altered to AN:DMI=84.9:15.0. The physical properties of the products are shown in Table 1. IR=2247 (cm$^-$, —CN). $^1$HNMR (d$_6$-DMSO, ppm): 3.5-3.4 (methoxy of carbonyl, copolymerization product of DMI); 3.3-3.2 (methoxy of carbonyl, copolymerization product of DMI); 3.2-2.9 (α-H); 2.2-2.0 (β-H, copolymerization products of DMI and AN). In accordance with the $^1$HNMR spectrum, AN:DMI=79.8:20.2 (mol/mol %) was calculated.

Example 5

Preparation of Precursor Raw Material for Carbon Fibers (V) (Poly(AN96.9-co-DMI3.1))

The reaction conditions were similar to Example 1. However, the molar ratio of the added monomers was altered to AN:DMI=97.9:2.0. The physical properties of the products are shown in Table 1. IR=2250 (cm$^{-1}$, —CN). $^1$HNMR (d$_6$-DMSO, ppm): 3.5-3.4 (methoxy of carbonyl, copolymerization product of DMI); 3.3-3.2 (methoxy of carbonyl, copolymerization product of DMI); 3.2-2.9 (α-H); 2.2-2.0 (β-H, copolymerization products of DMI and AN). In accordance with the $^1$HNMR spectrum, AN:DMI=96.9:3.1 (mol/mol %) was calculated.

Example 6

Preparation of Precursor Raw Material for Carbon Fibers (VI) (Poly(AN98.5-co-DMI1.5))

The reaction conditions were similar to Example 1. However, the molar ratio of the added monomers was altered to AN:DMI=98.9:1.0. The physical properties of the products are shown in Table 1. IR=2250 (cm$^{-1}$, —CN). $^1$HNMR (d$_6$-DMSO, ppm): 3.5-3.4 (methoxy of carbonyl, copolymerization product of DMI); 3.3-3.2 (methoxy of carbonyl, copolymerization product of DMI); 3.2-2.9 (α-H); 2.2-2.0 (β-H, copolymerization products of DMI and AN). In accordance with the $^1$HNMR spectrum, AN:DMI=98.5:1.5 (mol/mol %) was calculated.

Example 7

Preparation of Precursor Raw Material for Carbon Fibers (VII) (Poly(AN84.3-co-DMI6.5-co-MA9.2))

The reaction conditions were similar to Example 1. However, the molar ratio of the added monomers was altered to AN:DMI:MA=84.9:4.0:11.0. The physical properties of the products are shown in Table 1. IR=2251 (cm$^{-1}$, —CN). $^1$HNMR (d$_6$-DMSO, ppm): 3.5-3.4 (methoxy of carbonyl, copolymerization product of MA and DMI); 3.3-3.2 (methoxy of carbonyl, copolymerization product of DMI); 3.2-2.9 (α-H); 2.2-2.0 (β-H, copolymerization products of DMI, MA and AN). In accordance with the $^1$HNMR spectrum, AN:DMI:MA=84.3:6.5:9.2 (mol/mol/mol %) was calculated.

Example 8

Preparation of Precursor Raw Material for Carbon Fibers (VIII) (Poly(AN97.6-co-DMI1.8-co-MA0.6))

The reaction conditions were similar to Example 1. However, the molar ratio of the added monomers was altered to AN:DMI:MA=97.9:1.5:0.5. The physical properties of the products are shown in Table 1. IR=2247 (cm$^{-1}$, —CN). $^1$HNMR (d$_6$-DMSO, ppm): 3.5-3.4 (methoxy of carbonyl, copolymerization product of MA and DMI); 3.3-3.2 (methoxy of carbonyl, copolymerization product of DMI); 3.2-2.9 (α-H); 2.2-2.0 (β-H, copolymerization products of DMI, MA and AN). In accordance with the $^1$HNMR spectrum, AN:DMI:MA=97.6:1.8:0.6 (mol/mol/mol %) was calculated.

Comparative Example 1

Preparation of Conventional Precursor Raw Material for Carbon Fibers (I) (Poly(AN85.4-co-MA14.6))

First, 15.0 mol % of methyl acrylate (MA), 84.85 mol % of acrylonitrile (AN), 0.05 mol % of mercaptoundecane (chain transfer agent), 0.1% of 2,2'-azobisisobutyronitrile (AIBN) (initiator) and 250 ml of dimethylsulfoxide (DMSO) (solvent) were mixed and reacted in a 500-ml glass reactor under 60-70° C. with stirring for 5 hours. Next, precipitates were obtained by adding methanol during a precipitation process.

After filtration and drying, the physical properties of the precipitates were analyzed, as shown in Table 1. IR=2245 (cm$^{-1}$, —CN). $^1$HNMR (d$_6$-DMSO, ppm): 3.5-3.4 (methoxy of carbonyl, copolymerization product of MA); 3.2-2.9 (α-H); 2.2-2.0 (β-H, copolymerization products of MA and AN); 0.8-1.9 (mercaptoundecane moiety). In accordance with the $^1$HNMR spectrum, AN:MA=85.4:14.6 (mol/mol %) was calculated.

Comparative Example 2

Preparation of Conventional Precursor Raw Material for Carbon Fibers (II)
(Poly(AN97.7-co-MA1.7-co-IA0.6))

First, 2.0 mol % of methyl acrylate (MA), 97.4 mol % of acrylonitrile (AN), 0.5 mol % of itaconic acid, (IA), 0.1% of 2,2'-azobisisobutyronitrile (AIBN) (initiator) and 250 ml of dimethylsulfoxide (DMSO) (solvent) were mixed and reacted in a 500-ml glass reactor under 60-70° C. with stirring for 7 hours. Next, precipitates were obtained by adding methanol during a precipitation process. After filtration and drying, the physical properties of the precipitates were analyzed, as shown in Table 1. IR=3700-300 (—COOH, IA derivative); 2243 (cm$^{-1}$, —CN). $^1$HNMR (d$_6$-DMSO, ppm): 3.5-3.4 (methoxy of carbonyl, copolymerization product of MA); 3.2-2.9 (α-H); 2.2-2.0 (β-H, copolymerization products of MA, IA and AN). In accordance with the $^1$HNMR spectrum, AN:MA:IA=97.7:1.7:0.6 (mol/mol/mol %) was calculated.

Example 9

Comparison of Oxidization Temperatures of Various Copolymers

Ten PAN copolymers prepared from Examples 1-8 and Comparative Examples 1-2 were analyzed under thermal gas using a differential scanning calorimeter (DSC) (the sample box was continuously conducted with gas). The heating rate was 10° C./min. The comparison of the oxidization temperatures (the temperature of the maximal peak) of various copolymers are shown in Table 1.

Example 10

Comparison of Oxidization Time of Various Copolymers Under a Fixed Temperature

Ten PAN copolymers prepared from Examples 1-8 and Comparative Examples 1-2 were analyzed under thermal gas using a differential scanning calorimeter (DSC) (the sample box was continuously conducted with gas). The temperature was fixed at 250° C. The duration was from 0 to 60 min. The comparison of the oxidization time (the time achieving the maximal peak) of various copolymers under a fixed temperature are shown in Table 1.

Example 11

Melt-Spinning Experiment

A melt-spinning experiment (spinneret: 0.5 mm, spinning temperature: 175-210° C., rolling rate: 30-70 m/min) was performed on six melt-spinning PAN copolymers selected from Examples 1-4, 7 and Comparative Example 1, respectively. The results are shown in Table 1. The rolling condition of the examples was quality, except for Example 1 (high fiber breakage and deteriorated spinning condition). The strength of the fiber precursors was 2.0-3.1 g/den. The elongation thereof was 30.0-14.0%.

Example 12

Wet-Spinning Experiment

A wet-spinning experiment was performed on four wet-spinning PAN copolymers selected from Examples 5, 6, 8 and Comparative Example 2, respectively. These samples were prepared with a dimethylsulfoxide (DMSO) (solvent) to form various spinning solutions with a concentration of 23%. The wet-spinning experiment was performed using a fix-pressure extruder (spinneret: 0.05 mm, spinning temperature: 60-85° C.). The first-stage coagulating solution was dimethylsulfoxide (DMSO) (80%) and water (20%). The second-stage coagulating solution was dimethylsulfoxide (DMSO) (60%) and water (40%). The rolling rate was 30-70 m/min. The formed fiber precursors were then washed with water and dried. The strength of the fiber precursors was 3.0-3.8 g/den. The elongation thereof was 11-7%.

Example 13

Comparison of Oxidization Reaction and Oxidization Rate of Melt-Spinning Fiber Precursors The melt-spinning fiber precursors of Example 11 were hung (the bottom of the fiber was tied with a hammer) in an oven and oxidized under thermal gas. The ? steps are described as follows. At the first oxidization step, the fiber precursors were oxidized at 150° C. for 3 hours. At the second oxidization step, the temperature was slowly increased to 160° C. and the fiber precursors were continuously oxidized for 3 hours. At the third oxidization step, the temperature was slowly increased to 170° C. and the fiber precursors were continuously oxidized for 2 hours. At the fourth oxidization step, the temperature was slowly increased to 180° C. and the fiber precursors were continuously oxidized for 16 hours. Various oxidized fibers after oxidization were then respectively tested using a differential scanning calorimeter (DSC) (heating rate: 10° C./min). Respective enthalpies (ΔH) were obtained. The respective enthalpies (ΔH) of these oxidized fibers were compared with the corresponding enthalpies (ΔH) of Example 9 (the enthalpies (ΔH) of Example 9 represented the highest oxidization rates of the corresponding copolymers). The oxidization rates of the various oxidized fibers were then obtained.

Calculation: oxidization rate (%)=100%×(ΔH of Example 9−ΔH of Example 13)/ΔH of Example 9). The strength of the oxidized fibers was 1.1-1.6 g/den. The elongation thereof was 24-15%. The density thereof was 1.21-1.30 g/cm$^3$. The limiting oxygen index (LOI) was 41-56.

Example 14

Comparison of Oxidization Reaction and Oxidization Rate of Wet-Spinning Fiber Precursors The wet-spinning fiber precursors of Example 12 were hung (the bottom of the fiber was tied with a hammer) in an oven and oxidized under thermal gas. The ? steps are described as follows. At the first oxidization step, the fiber precursors were oxidized at 190° C. for 30 min. At the second oxidization step, the temperature was slowly increased to 220° C. and the fiber precursors were continuously oxidized for 30 min. At the third oxidization step, the temperature was slowly increased to 240° C. and the fiber precursors were continuously oxidized for 30 min. Various oxidized fibers after oxidization were then respectively tested using a differential scanning calorimeter (DSC) (heating rate: 10° C./min). Respective enthalpies (ΔH) were obtained. The respective enthalpies (ΔH) of these oxidized fibers were compared with the corresponding enthalpies (ΔH) of Example 9 (the enthalpies (ΔH) of Example 9 represented the highest oxidization rates of the corresponding copolymers). The oxidization rates of the various oxidized fibers were then obtained.

Calculation: oxidization rate (%)=100%×(ΔH of Example 9−ΔH of Example 14)/ΔH of Example 9). The strength of the oxidized fibers was 1.8-2.7 g/den. The elongation thereof was 3.0-1.8%. The density thereof was 1.28-1.33 g/cm$^3$. The limiting oxygen index (LOI) was 48-62.

Example 15

Carbonization of Oxidized Fibers

The oxidized fibers prepared by Example 14 were placed in a carbonization oven conducted with nitrogen gas. At the first carbonization step, the temperature was increased to 600-800° C. and the oxidized fibers were carbonized for 5 min. At the second carbonization step, the temperature was continuously increased to 1,000-1,200° C. and the oxidized fibers were carbonized for 5 min. The density of the formed carbon fibers was 1.61-1.76 kg/m$^3$.

Example 16

Oxidization Process of Dimethyl Itaconate-Containing Copolymer (Poly(DMI39-co-MA61))

The synthesis of Poly(DMI39-co-MA61) copolymer was similar to Example 1, but the added monomers "MA" replaced the "AN" (the added monomers were DMI and MA, without AN). The molar ratio of the added monomers was "DMI:MA=50:50". Product analysis: IR=1710 (cm$^{-1}$, carboxy of ester). $^1$HNMR (d$_6$-DMSO, ppm): 3.5-3.4 (methoxy of carbonyl, copolymerization product of MA and DMI); 3.3-3.2 (methoxy of carbonyl, copolymerization product of DMI); 3.2-2.9 (α-H); 2.2-2.0 (β-H, copolymerization products of DMI and MA). In accordance with the $^1$HNMR spectrum, DMI:MA=39:61 (mol/mol %) was calculated. The product was represented by Poly(DMI39-co-MA61). Poly(DMI39-co-MA61) was placed in an oven and oxidized under thermal gas. The ? steps are described as follows. At the first oxidization step, Poly(DMI39-co-MA61) was oxidized at 150° C. for 3 hours. At the second oxidization step, the temperature was slowly increased to 160° C. and Poly(DMI39-co-MA61) was continuously oxidized for 3 hours. At the third oxidization step, the temperature was slowly increased to 170° C. and Poly(DMI39-co-MA61) was continuously oxidized for 2 hours. At the fourth oxidization step, the temperature was slowly increased to 180° C. and Poly(DMI39-co-MA61) was continuously oxidized for 16 hours. The oxidized products were respectively sampled after oxidization at 150° C., 160° C., 170° C. and 180° C. The samples were then analyzed by an IR spectrum. The results of the IR spectrum demonstrate that a broad absorption peak (3,500-3,000 cm$^{-1}$, —OH or —COOH) was exhibited after oxidization at 160° C., but no such peak was exhibited before oxidization. Compared to poly(methyl acrylate), Poly(DMI39-co-MA61) exhibited an apparently broader absorption peak at 3,500-3,000 cm$^{-1}$; demonstrating that DMI was formed into an acidic compound during high-temperature oxidization.

TABLE 1

| Examples | MA (mol %) | AN (mol %) | DMI (mol %) | IV (dl/g) | Spinning estimation | Oxidization peak temperature (° C., DSC) a* | Oxidization peak time (DSC, min) b* | Oxidization rate (%) |
|---|---|---|---|---|---|---|---|---|
| Example 1 | 0 | 89.5 | 10.5 | 0.71 | Melt-spinning, hard to roll | 274 | 7 | >99 c* |
| Example 2 | 0 | 86.4 | 13.6 | 0.66 | Melt-spinning, easy to roll | 271 | 6 | >99 c* |
| Example 3 | 0 | 84.7 | 15.3 | 0.65 | Melt-spinning, easy to roll | 269 | 6 | >99 c* |
| Example 4 | 0 | 79.8 | 20.2 | 0.42 | Melt-spinning, easy to roll | 266 | 5 | >99 c* |
| Example 5 | 0 | 96.9 | 3.1 | 1.92 | Wet-spinning | 255 | <2 | 85 d* |
| Example 6 | 0 | 98.5 | 1.5 | 2.50 | Wet-spinning | 256 | <2 | 82 d* |
| Example 7 | 9.2 | 84.3 | 6.5 | | Melt-spinning, easy to roll | 278 | 10 | 85 c* |
| Example 8 | 0.6 | 97.6 | 1.8 | | Wet-spinning | 256 | <2 | 83 d* |
| Com. Example 1 | 14.6 | 85.4 | 0 | 0.71 | Melt-spinning, easy to roll | 307 | 25 | 20 c* |
| Com. Example 2 | 1.7 | 97.7 | 0, IA = 0.6 | 1.91 | Wet-spinning | 266 | <2 | 72 d* | a*: DSC, heating rate: 10° C./min
b*: DSC, fixed temperature: 250° C., duration: 0-60 min TABLE 1-continued

| Examples | MA (mol %) | AN (mol %) | DMI (mol %) | IV (dl/g) | Spinning estimation | Oxidization peak temperature (° C., DSC) a* | Oxidization peak time (DSC, min) b* | Oxidization rate (%) |
|---|---|---|---|---|---|---|---|---| c*: the fiber precursor was thermally oxidized in an oven (gas), temperature: 150-180° C., 24 hours, and the product was then tested using a differential scanning calorimeter (DSC) (heating rate: 10° C./min) and oxidization rate thereof was calculated d*: the fiber precursor was thermally oxidized in an oven (gas), temperature: 190° C.-220° C.-240° C., respectively for 30 min, and the product was then tested using a differential scanning calorimeter (DSC) (heating rate: 10° C./min) and oxidization rate thereof was calculated

Example 17

Preparation of Precursor Composite Raw Material for Carbon Fibers (I) (Comprising Poly(AN89.5-co-DMI10.5) and 0.5 Wt % of Carbon Nanotubes (CNT) with Carboxyl Groups or Hydroxyl Groups Prepared Using Concentrated Fuming Sulfuric Acid)

First, 92.9 mol % of acrylonitrile (AN), 7.0 mol % of dimethyl itaconate (DMI), 0.1% of 2,2'-azobisisobutyronitrile (AIBN) (initiator) and 250 ml of dimethylsulfoxide (DMSO) (solvent) were mixed and reacted in a 500-ml glass reactor under 60-70° C. with stirring for 7 hours. Next, precipitates were obtained by adding methanol during a precipitation process. After filtration and drying, the physical properties of the precipitates were analyzed, as shown in Table 2. IR=2250 (cm$^{-1}$, —CN). $^1$HNMR (d$_6$-DMSO, ppm): 3.5-3.4 (methoxy of carbonyl, copolymerization product of DMI); 3.3-3.2 (methoxy of carbonyl, copolymerization product of DMI); 3.2-2.9 (α-H); 2.2-2.0 (β-H, copolymerization products of DMI and AN). In accordance with the $^1$HNMR spectrum, AN:DMI=89.5:10.5 (mol/mol %) was calculated.

Poly(AN89.5-co-DMI10.5), 0.5 wt % of carbon nanotubes (CNT) and dimethylsulfoxide (DMSO) were prepared to form a spinning solution with a solid content of 20 wt %.

Example 18

Preparation of Precursor Composite Raw Material for Carbon Fibers (II) (Comprising Poly(AN96.9-co-DMI3.1) and 0.5 Wt % of Carbon Nanotubes (CNT) with Carboxyl Groups or Hydroxyl Groups Prepared Using Concentrated Fuming Sulfuric Acid)

The reaction conditions were similar to Example 17. However, the molar ratio of the added monomers was altered to AN:DMI=97.9:2.0. The physical properties of the products are shown in Table 2. IR=2250 (cm$^{-1}$, —CN). $^1$HNMR (d$_6$-DMSO, ppm): 3.5-3.4 (methoxy of carbonyl, copolymerization product of DMI); 3.3-3.2 (methoxy of carbonyl, copolymerization product of DMI); 3.2-2.9 (α-H); 2.2-2.0 (β-H, copolymerization products of DMI and AN). In accordance with the $^1$HNMR spectrum, AN:DMI=96.9:3.1 (mol/mol %) was calculated.

Poly(AN96.9-co-DMI3.1), 0.5 wt % of carbon nanotubes (CNT) and dimethylsulfoxide (DMSO) were prepared to form a spinning solution with a solid content of 25 wt %.

Example 19

Preparation of Precursor Composite Raw Material for Carbon Fibers (III) (Comprising Poly(AN89.5-co-DMI10.5) and 1.0 Wt % of Carbon Nanotubes (CNT) with Carboxyl Groups or Hydroxyl Groups Prepared Using Concentrated Fuming Sulfuric Acid)

The reaction conditions were similar to Example 17. However, the weight percent of the added carbon nanotubes was altered to 1.0 wt %.

Example 20

Preparation of Precursor Composite Raw Material for Carbon Fibers (IV) (Comprising Poly(AN96.9-co-DMI3.1) and 1.0 Wt % of Carbon Nanotubes (CNT) with Carboxyl Groups or Hydroxyl Groups Prepared Using Concentrated Fuming Sulfuric Acid)

The reaction conditions were similar to Example 18. However, the weight percent of the added carbon nanotubes was altered to 1.0 wt %.

Example 21

Preparation of Precursor Composite Raw Material for Carbon Fibers (V) (Comprising Poly(AN89.5-co-DMI10.5) and 1.0 Wt % of Carbon Nanotubes (CNT) with Phenyl Groups)

The reaction conditions were similar to Example 19. However, the added carbon nanotubes were altered to carbon nanotubes with phenyl groups.

Example 22

Preparation of Precursor Composite Raw Material for Carbon Fibers (VI) (Comprising Poly(AN96.9-co-DMI3.1) and 1.0 Wt % of Carbon Nanotubes (CNT) with Phenyl Groups)

The reaction conditions were similar to Example 20. However, the added carbon nanotubes were altered to carbon nanotubes with phenyl groups.

Comparative Example 3

Preparation of Conventional Precursor Composite Raw Material for Carbon Fibers (I) (Comprising Poly(AN89.5-co-MA10.5) and 0.5 Wt % of Carbon Nanotubes (CNT) with Carboxyl Groups or Hydroxyl Groups Prepared Using Concentrated Fuming Sulfuric Acid)

First, 11.00 mol % of methyl acrylate (MA), 88.85 mol % of acrylonitrile (AN), 0.05 mol % of mercaptoundecane (chain transfer agent), 0.1% of 2,2'-azobisisobutyronitrile (AIBN) (initiator) and 250 ml of dimethylsulfoxide (DMSO) (solvent) were mixed and reacted in a 500-ml glass reactor under 60-70° C. with stirring for 5 hours. Next, precipitates were obtained by adding methanol during a precipitation process. After filtration and drying, the physical properties of the precipitates were analyzed, as shown in Table 2. IR=2245 (cm$^{-1}$, –CN). $^1$HNMR (d$_6$-DMSO, ppm): 3.5-3.4 (methoxy of carbonyl, copolymerization product of MA); 3.2-2.9 (α-H); 2.2-2.0 (β-H, copolymerization products of MA and AN); 0.8-1.9 (mercaptoundecane moiety). In accordance with the $^1$HNMR spectrum, AN:MA=89.5:10.5 (mol/mol %) was calculated.

Poly(AN89.5-co-MA 10.5), 0.5 wt % of carbon nanotubes (CNT) and dimethylsulfoxide (DMSO) were prepared to form a spinning solution with a solid content of 20 wt %.

Comparative Example 4

Preparation of Conventional Precursor Raw Material for Carbon Fibers (II) (Comprising Poly(AN97.7-co-MA1.7-co-IA0.6) and 1.0 Wt % of Carbon Nanotubes (CNT) with Carboxyl Groups or Hydroxyl Groups Prepared Using Concentrated Fuming Sulfuric Acid)

First, 2.0 mol % of methyl acrylate (MA), 97.4 mol % of acrylonitrile (AN), 0.5 mol % of itaconic acid, (IA), 0.1% of 2,2'-azobisisobutyronitrile (AIBN) (initiator) and 250 ml of dimethylsulfoxide (DMSO) (solvent) were mixed and reacted in a 500-ml glass reactor under 60-70° C. with stirring for 7 hours. Next, precipitates were obtained by adding methanol during a precipitation process. After filtration and drying, the physical properties of the precipitates were analyzed, as shown in Table 2. IR=3700-300 (—COOH, IA derivative); 2243 (cm$^{-1}$, —CN). $^1$HNMR (d$_6$-DMSO, ppm): 3.5-3.4 (methoxy of carbonyl, copolymerization product of MA); 3.2-2.9 (α-H); 2.2-2.0 (β-H, copolymerization products of MA, IA and AN). In accordance with the $^1$HNMR spectrum, AN:MA:IA=97.7:1.7:0.6 (mol/mol/mol %) was calculated.

Poly(AN97.7-co-MA1.7-co-IA0.6), 1.0 wt % of carbon nanotubes (CNT) and dimethylsulfoxide (DMSO) were prepared to form a spinning solution with a solid content of 25 wt %.

TABLE 2

| | MA (mol %) | AN (mol %) | DMI (mol %) | CNT (wt %) | Oxidization rate (%) |
|---|---|---|---|---|---|
| Example 1 | 0 | 89.5 | 10.5 | 0.5 | >99 |
| Example 2 | 0 | 96.9 | 3.1 | 0.5 | 82 |
| Example 3 | 0 | 89.5 | 10.5 | 1.0 | >99 |
| Example 4 | 0 | 96.9 | 3.1 | 1.0 | 84 |
| Example 5 | 0 | 89.5 | 10.5 | 1.0 | >99 |
| Example 6 | 0 | 96.9 | 3.1 | 1.0 | 82 |
| Com. Example 1 | 10.5 | 89.5 | 0 | 0.5 | 30 |
| Com. Example 2 | 1.7 | 97.7 | 0 (IA = 0.6) | 1.0 | 76 |

Example 23

Wet-Spinning Experiment

PAN copolymers and carbon nanotubes (CNT) with various weight ratios therebetween, as shown in Table 2, of Examples 17-22 and Comparative Examples 3-4 were selected. These samples were prepared with a dimethylsulfoxide (DMSO) (solvent) to form various spinning solutions with a solid content of 23 wt %. A wet-spinning experiment was performed using a fix-pressure extruder (spinneret: 0.05 mm, spinning temperature: 60-85° C.). The first-stage coagulating solution was dimethylsulfoxide (DMSO) (80%) and water (20%). The second-stage coagulating solution was dimethylsulfoxide (DMSO) (60%) and water (40%). The rolling rate was 30-70 m/min. The formed fiber precursor was then washed with water and dried. The strength of the fiber precursor was 3.5-6.7 g/den. The elongation thereof was 11-21%.

Example 24

Comparison of Oxidization Reaction of Fiber Precursors and Oxidization Rate of Oxidized Fibers First, the fiber precursors prepared from Example 23 were analyzed using a differential scanning calorimeter (DSC) (heating rate: 10° C./min) under thermal gas. Respective enthalpies ($\Delta H_1$) were obtained. The enthalpies ($\Delta H_1$) represented the highest oxidization rates of the fiber precursors. Additionally, the fiber precursors prepared from Example 23 were hung (the bottom of the fiber was tied with a hammer) in an oven and oxidized under thermal gas. The oxidization steps are described as follows. At the first oxidization step, the fiber precursors were oxidized at 190° C. for 30 min. At the second oxidization step, the temperature was slowly increased to 220° C. and the fiber precursors were continuously oxidized for 30 min. At the third oxidization step, the temperature was slowly increased to 240° C. and the fiber precursors were continuously oxidized for 30 min. Various oxidized fibers after oxidization were then respectively tested using a differential scanning calorimeter (DSC) (heating rate: 10° C./min). Respective enthalpies ($\Delta H_2$) were obtained. The enthalpies ($\Delta H_2$) represented the unoxidized amount of the fiber precursors after oxidization. Therefore, ($\Delta H_1 - \Delta H_2$) represented the oxidized amount of the fiber precursors after oxidization. The oxidization rates of the various oxidized fibers were then obtained.

Calculation: oxidization rate (%)=100%×($\Delta H_1 - \Delta H_2$)/$\Delta H_1$). The results are shown in Table 2.

After testing, the strength of the formed oxidized fibers was 1.5-4.5 g/den. The elongation thereof was 10-28%. The density thereof was 1.25-1.35 g/cm$^3$. The limiting oxygen index (LOI) was 28-60.

Example 25

Carbonization of Oxidized Fibers

The oxidized fibers prepared by Example 24 were thermally treated under 600-1,200° C. to form carbon fibers. The strength of the formed carbon fibers was 2.5-3.2 GPa. The elongation thereof was 0.2-4.1%. The modulus thereof was 210-241 GPa. The density thereof was 1.6-1.8 kg/m$^3$.

In accordance with Table 2, the oxidized fibers prepared from the precursor composite raw materials composed of Poly(AN-co-DMI) and carbon nanotubes of the invention had higher oxidization rates than those of the oxidized fibers respectively prepared from the precursor composite raw materials composed of Poly(AN-co-MA) and carbon nanotubes of Comparative Example 3 and Poly(AN-co-MA-co-IA) and carbon nanotubes of Comparative Example 4. The disclosed oxidized fibers having higher oxidization rates under the same oxidization conditions means that the oxidized fibers achieved the same oxidization rates within a shorter oxidization time.

The above-mentioned comparative results indicate that the oxidization time of the disclosed Poly(AN-co-DMI) was shorter than that of other copolymers. Thus, oxidization reaction under a lower temperature of the fiber precursor prepared from the precursor composite raw material composed of such Poly(AN-co-DMI) and carbon nanotubes can be conducted. Also, the formed oxidized fibers after oxidization of such fiber precursors had higher oxidization rates than those of other oxidized fibers. That is, the oxidization time for forming such oxidized fibers was short. The disclosed precursor composite raw material composed of Poly(AN-co-DMI) and carbon nanotubes reduces the required oxidization time and oxidization temperature of the fiber precursors so that the manufacturing cost and defects of the carbon fibers are simultaneously reduced.

While the invention has been described by way of examples and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A precursor raw material for the PAN-based carbon fibers, represented by Formula (I):

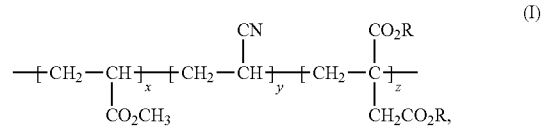

wherein
R is methyl, ethyl or propyl;
x+z=13.6-20.2 mol %;
z≥0.5 mol %;
y=79.8-86.4 mol %; and
x+y+z=100 mol %.

* * * * *